(12) United States Patent
Brambilla et al.

(10) Patent No.: US 6,835,477 B1
(45) Date of Patent: Dec. 28, 2004

(54) FUEL CELL WITH COOLING SYSTEM BASED ON DIRECT INJECTION OF LIQUID WATER

(75) Inventors: Massimo Brambilla, Bussero (IT);
Gabriele Mazzucchelli, Milan (IT)

(73) Assignee: Nuvera Fuel Cells Europe S.r.l. (IT)

( * ) Notice: Subject to any disclaimer, the term of this patent is extended or adjusted under 35 U.S.C. 154(b) by 0 days.

(21) Appl. No.: 09/937,973

(22) PCT Filed: Apr. 10, 2000

(86) PCT No.: PCT/EP00/03171

§ 371 (c)(1),
(2), (4) Date: Oct. 1, 2001

(87) PCT Pub. No.: WO00/63992

PCT Pub. Date: Oct. 26, 2000

(30) Foreign Application Priority Data

Apr. 21, 1999 (IL) ......................................... MI99A0829

(51) Int. Cl.[7] ................................................ H01M 8/00
(52) U.S. Cl. ............................ 429/12; 429/26; 429/30; 429/31; 429/33; 429/34; 429/40; 429/42; 429/44; 429/209; 429/210
(58) Field of Search ............................ 429/12, 26, 30, 429/31, 33, 34, 40, 42, 44, 209, 210

(56) References Cited

U.S. PATENT DOCUMENTS

| 4,769,297 | A | | 9/1988 | Reiser et al. |
| 5,635,039 | A | * | 6/1997 | Cisar et al. .................. 204/252 |
| 6,015,633 | A | | 1/2000 | Carlstrom et al. |
| 6,022,634 | A | * | 2/2000 | Ramunni et al. ............. 429/34 |

FOREIGN PATENT DOCUMENTS

| EP | 0301757 | 2/1989 |
| EP | 0328115 | 8/1989 |
| EP | 0743693 | 11/1996 |
| EP | 0817297 | 1/1998 |
| WO | 9845839 | 10/1998 |
| WO | 9960640 | 11/1999 |

* cited by examiner

*Primary Examiner*—Bruce F. Bell
*Assistant Examiner*—Gentle E. Winter
(74) *Attorney, Agent, or Firm*—Muserlian, Lucas and Mercanti (57) ABSTRACT

The invention relates to a stack of polymeric membrane fuel cells, wherein the removal of the heat generated by the production of electric energy and the humidification of the ion exchange membranes used as electrolytes are obtained by the direct injection of a water flow coming from a single hydraulic circuit. The stack thus produced is more compact, less expensive and easier to operate.

20 Claims, 10 Drawing Sheets

FIGURA 7B

FUEL CELL WITH COOLING SYSTEM BASED ON DIRECT INJECTION OF LIQUID WATER

This application is a 371 of PCT/EP00/03171 filed on Apr. 10, 2000.

DESCRIPTION OF THE INVENTION

The present invention relates to a fuel cell, and more precisely a fuel cell using a polymeric membrane as the electrolyte.

Fuel cells are chemical generators of electric energy in the form of direct current; in other words, they convert the free energy of reaction of a fuel (for example a gaseous mixture containing hydrogen, or a light alcohol such as methanol or ethanol) with an oxidant (for example air or oxygen) without its complete degradation to thermal energy, and therefore without being submitted to the limitation of the Carnot cycle. To achieve the desired conversion of chemical energy to electrical energy, the fuel is oxidised at the anode of the cell, with the concurrent release of electrons and $H^+$ ions, while the oxidant is reduced at the cathode, where $H^+$ ions are consumed; the two poles of the generator must be separated by a suitable electrolyte, allowing a continuous flow of $H^+$ ions from the anode to the cathode, at the same time hindering the transfer of electrons from one pole to the other, thereby maximising the electrical potential difference between the two electrodes. This potential difference represents in fact the driving force of the process itself. The fuel cells are considered as an excellent alternative to the traditional systems of electric generation; especially in view of their extremely favourable environmental impact (absence of polluting emissions and noise, formation of water as the only by-product), they are used both in the field of stationary power generation of various sizes (electrical power stations, back up power generators, etc.) as well as in the field of mobile applications (electric vehicle applications, generation of automotive energy or auxiliary energy for space, submarine and naval applications).

The polymeric membrane fuel cells offer, compared with other fuel cells, further advantages, due to their fast startup an quick achievement of the optimum operation conditions, the high power density, the intrinsic reliability connected both to the lack of moving parts and to the absence of corrosion phenomena and severe thermal cycles; in fact, among all the fuel cells of the prior art, the polymer electrolyte fuel cells exhibit the overall lowest operating temperature (usually, 70–100° C.).

The polymeric electrolyte used for this purpose is an ion-exchange membrane, and more precisely a cation-exchange membrane, that is a chemically inert polymer, partially functionalised with groups capable of undergoing acid-base hydrolysis leading to a separation of electric charge; said hydrolysis consists more precisely in the release of positive ions (cations) and in the formation of fixed negative charges on the polymer constituting the membrane. Porous electrodes are applied on the surface of the membrane, which allow for the reactants to flow therethrough up to the membrane interface. A catalyst is applied on said interface on the electrode and/or on the membrane side, such as for example platinum black, which favours the corresponding half-reaction of fuel oxidation or oxidant reduction. This arrangement provides also for the continuous flow of cations when a potential gradient is established between the two faces of the membrane and the external electric circuit is concurrently closed; being the $H^+$ ion the transported cation in this case, as previously mentioned, the potential difference generated upon feeding a species with a lower electrochemical potential at the anode, and a species with a higher electrochemical potential at the cathode, causes protonic conduction across electron flow (i.e. electric current) across the external circuit, as soon as the latter is closed.

The protonic conduction is an essential condition for the operation of a fuel cell and is one of the decisive parameters to assess its efficiency. An insufficient protonic conduction causes a remarkable drop in the potential difference at the poles of the cell (cell voltage drop) once the electric circuit is closed on the external resistive load which exploits the produced electric output. This, in turn, causes an increased degradation of the energy of reaction to thermal energy and the consequent decrease of the fuel conversion efficiency.

Several cation-exchange membranes, offering optimum protonic conduction characteristics, are available on the market and are widely used in industrial fuel cells, such as for example those commercialised under the trademark Nafion® by Dupont de Nemours, U.S.A., Gore Select® by Gore. U.S.A., Aciplex® by Asahi Chemicals, Japan. All these membranes are negatively affected by an intrinsic process limitation associated with their operation mechanism: being the separation of electric charge which enables the protonic conduction set by a hydrolysis mechanism, such membranes develop their conductivity only in the presence of liquid water. Although the formation of water is an intrinsic consequence of the operation of a fuel cell, its extent results almost always insufficient to maintain the correct hydration state of the membrane, especially when operating at a sufficiently high current density.

Operation at high current density in fact involves a decrease in the investment costs for a given power output, but also a decrease in the energy efficiency and the generation of a higher amount of heat. The large amount of heat generated in a fuel cell operating at a current density of practical use (for example between 150 and 1500 mA/cm$^2$) must be efficiently removed to permit the thermal regulation of the system, not only in view of the limited thermal stability of the ion-exchange membrane, usually unfit for operation above 100° C., but also to reduce as much as possible the evaporation of the produced water and its consequent removal by the flow of inerts and unconverted reactants from the cell. Furthermore, as the voltage at the poles of a single fuel cell is too small to allow a practical exploitation, said cells are usually connected in electrical series by means of bipolar junctions and assembled in a filter-press arrangement feeding the reactants in parallel, as illustrated in U.S. Pat. No. 3,012,086. In such a fuel cell battery arrangement, usually called a "stack", the problem of heat removal is amplified with respect to the case of a single cell, wherein it is possible to take advantage of the thermal convection through the external walls. For this reason, all the designs of prior art fuel cells provide suitable hydraulic circuits for the removal of heat by thermal exchange with a circulating fluid; such fluid may be fed inside serpentines formed in the bipolar plates or in appropriate sections intercalated between single cells in electrical connection therewith; both solutions further complicate the construction of the stacks, increasing weights and volumes, thereby reducing the power density, a parameter whose maximisation is highly desired especially in the case of mobile applications.

A less burdensome solution under this aspect is described in the PCT patent application no. WO 98/28809, wherein the cooling fluid is circulated in a peripheral section of the bipolar plate adjacent to the active surface of the cell; however, in this way a transversal temperature profile is obtained with the central area of the membrane operating at a temperature higher than that of the peripheral area, thereby establishing a thermal gradient which is potentially very dangerous for the integrity of the membrane itself.

Finally, even if the extent of the heat removal needed to set the system temperature below 100° C. appears to be achievable although quite demanding, the concurrent water drain from fuel cell stacks remains too high for the produced water to maintain a sufficient hydration level of the membranes alone; the stack designs of the prior art have therefore introduced a second auxiliary system, in addition to the cooling system, which provides for injecting the required additional amount of water into the generator. This circuit generally provides for pre-humidifying the reactants at the inlet of the anode and cathode compartments of the fuel cells, for example by bubbling in liquid water or by diffusion of water vapour though suitable membranes in auxiliary cells. Also this second circuit involves an evident increase in weight, volumes and investment costs; moreover, the quantity of water to be fed to the system must be strictly controlled as an excess of liquid in the cell compartments would lead to the dramatic consequence of blocking the access of the gaseous reactants to the surface of the electrodes. The only possibility to achieve a calibration, albeit indirect, of the water supplied by the above system is acting on the temperature of the water itself and thus on its vapour pressure. This in turn brings to the need of thermostating the humidification system of the fuel cell stacks, further complicating the construction design.

A more advantageous solution to ensure a suitable water supply to the reactant flow is disclosed in the European Patent Publication No. 316 626 where it is described the humidification of said flow through injection of atomised water thereto, for example by means of a ultrasonic aerosol generator. This solution partially mitigates the need of cooling the stack by a burdensome auxiliary heat exchange circuit, as part of the water fed thereto is vaporised inside the cell, thereby removing a substantial amount of heat. The system however is negatively affected by a basic drawback represented by the construction complexity associated with the aerosol generator which, besides being expensive, consumes a certain portion of the electric output generated by the fuel cells.

In addition, the time of permanence of water in the cell is too short to ensure at the same time the humidification of the membrane and the cooling of the stack without recurring to auxiliary circuits, especially at a high current density and with stacks comprising a high number of cells.

Furthermore, the humidification of the reactants or the addition of atomised water prior to sending said reactants to the inlet manifold may cause some water condensation or droplet formation therein, having the consequence of feeding an excess amount of water to some cells of the stack (typically tho closer to the reactants inlet) and an insufficient amount to some other cells (typically those farther from the reactants inlet).

The present invention consisting a fuel cell stack comprising a reticulated electrically and thermally conductive material interposed between the bipolar plate and the electrodic surface as described for example in U.S. Pat. No. 5,482,792, wherein humidification of the reactants and thermal control are obtained by a single-circuit direct injection of a suitable flow of water which partially evaporates inside the reticulated material exploiting its high surface and its thermal conductivity which allows an efficient extraction of heat from the electrodes.

In one embodiment of the invention, the injection point of the water in the gaseous flow is positioned downstream the reactant inlet manifold.

In another embodiment, said injection point is positioned in correspondence of the periphery of the reticulated material, in areas physically separated from the ones where the reactants are fed.

In another embodiment, water is injected in correspondence of depressions formed inside the reticulated material.

In another embodiment, water is injected in correspondence of serpentine-shaped depressions provided inside the reticulated material and running along the whole surface of the same.

In another embodiment, water is injected in correspondence of offset double comb-shaped depressions provided inside the reticulated material.

The invention will be now described making reference to the figures, wherein.

Figure 1:
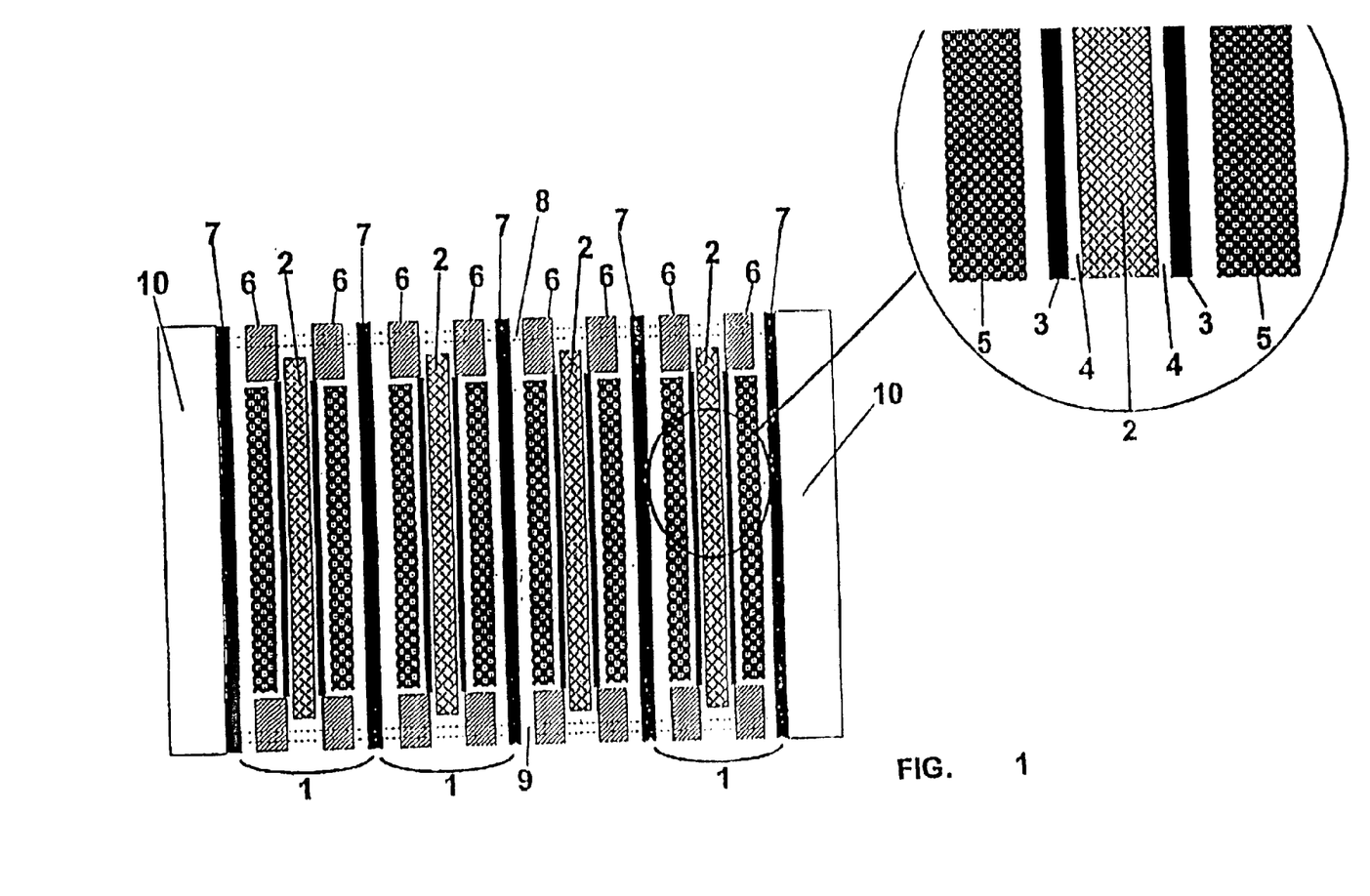
FIG. 1 shows a general scheme of a membrane fuel cell stack of the invention, assembled in a filter-press arrangement

Making reference to FIG. 1, each elementary cell (1), which represents the repetitive unit of the modular assembly of the filter-press arrangement, comprises, proceeding from the inside to the outside, an ion-exchange membrane (2), a pair of porous electrodes (3), a pair of catalytic layers (4) formed at the interface between the membrane (2) and each of the electrodes (3), a pair of electrically conductive reticulated elements (5), a pair of gaskets (6) for the peripheral sealing, a pair of bipolar plates (7) which delimit the boundary of the elementary cell (1). The reticulated elements (5) have a minimum porosity of 50%, and perform the functions of electrically connecting the bipolar plates (7) to the electrodes (3), and distributing the gaseous reactants and the humidification water, finely subdividing the latter through all the thickness of the reticulated element (5) and thus favouring the evaporation inside the whole volume of the chamber delimited by the bipolar plate (7) and the electrode (3). Suitable apertures on the peripheral area of the bipolar plates (7) and of the gaskets (6) form, upon juxtaposition of the above mentioned components, the two upper manifolds (8), only one of which is shown in the figure, which may be used to feed the reactants, and the two lower manifolds (9), which may be used for discharging the produced water, the gaseous inerts and the non-converted portion of the reactants, only one of which is shown in the figure. Alternatively, the lower manifolds (9) may be used as feeding ducts and the upper manifolds (8) as discharge ducts. It is also possible to feed one of the two reactants through one of the upper manifolds (8), using the corresponding lower manifold (9) as the outlet, while feeding the other reactant through the other lower manifold (9), using the corresponding upper manifold (8) as the outlet.

Externally to the elementary cell (1) assembly in a filter-press arrangement, there are two end plates (10), one of which is provided with fittings for the hydraulic connection to the manifolds (8) and (9), not shown in the figure, and both of which provided with suitable holes for the tie-rods used to clamp the complete stack, also not shown in the figure. Making reference to figures 2A and 2B, each elementary cell (1'), which constitutes the repetitive unit of the modular assembly of the filter-press arrangement, comprises, proceeding from the inside to the outside, an ion-exchange membrane (2'), a pair of porous electrodes (3'), a pair of catalytic layers (4') formed at the interface between the membrane (2') and each of the electrodes (3'), a pair of planar gaskets (6') for the hydraulic sealing, a pair of bipolar plates (7') which delimit the boundary of the elementary cell (1'). The bipolar plates (7') have a ribbed profile (11), the projecting part of which ensures the electrical continuity through the stack, while the depressed part allows the circulation of gases and water. Suitable apertures in the peripheral area of the bipolar plates (7') form, upon juxtaposition of the above mentioned components, the two upper manifolds (8'), only one of which is shown in the figure, which may be used to feed the reactants, and the two lower manifolds (9'), which may be used for discharging the produced water, the gaseous inerts and the non-converted portion of the reactants, only one of which is shown in the figure.

Figures 2A, 2B:
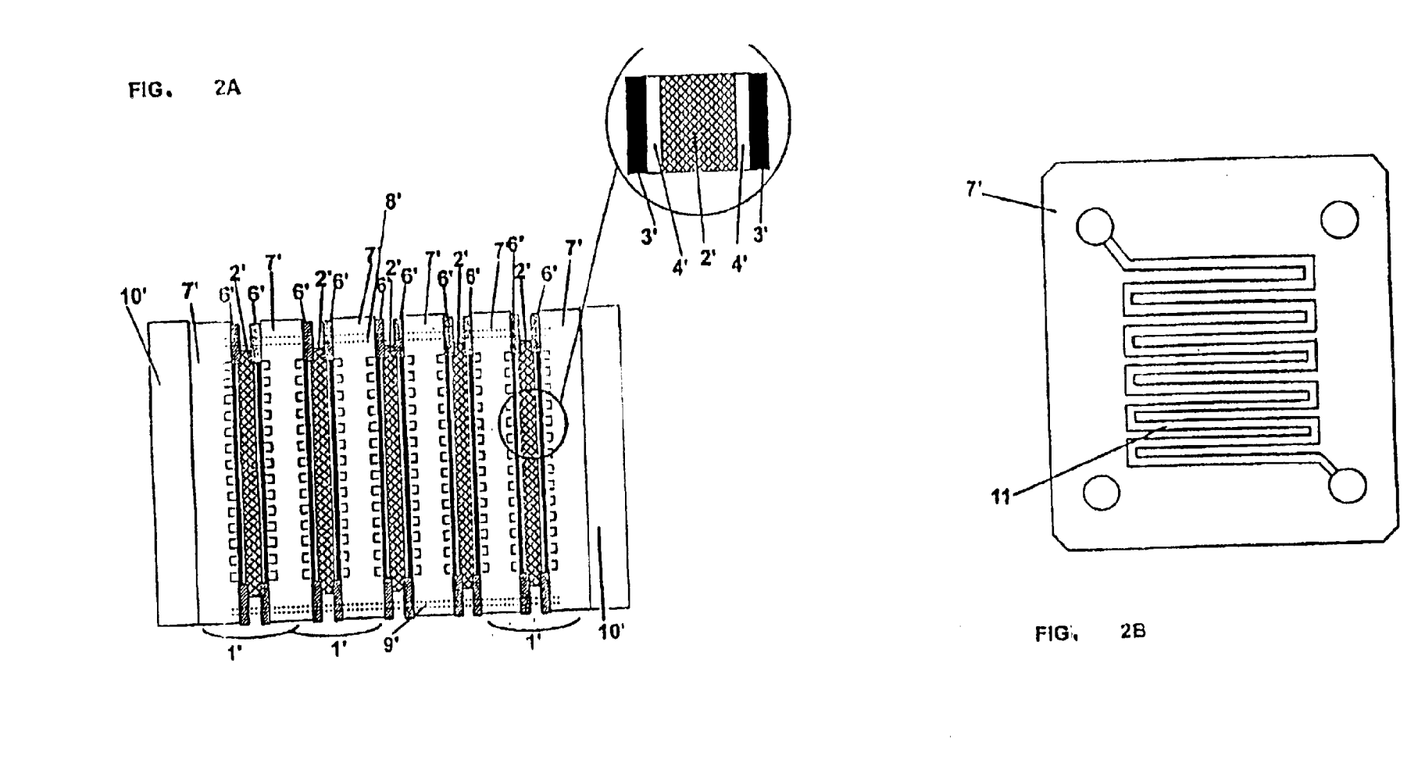
FIG. 2A shows a general scheme of a membrane fuel cell stack of the prior art, assembled in a filter-press arrangement.
FIG. 2B shows a bipolar plate of the prior art.

Also in this case it is possible to invert the function of the lower and upper manifolds.

Externally to the elementary cell (1') assembly in a filter-press arrangement there are two end plates (10'), one of which is provided with fittings for the hydraulic connection to the manifolds (8') and (9'), not shown in the figure, and both of which provided with suitable holes for the tie-rods that clamp the complete stack, also not shown in the figure.

Making reference to FIGS. 3, 4, 5 and 6, some embodiments of gaskets (6) are shown which comprise an upper hole (12), which forms the upper manifold (8), by juxtaposition in a filter-press arrangement, a lower hole (13), which forms the lower manifold (9) by juxtaposition in a filter-press arrangement, the housing (14) for the reticulated element (5) and, optionally, one or more channels for the injection of water (15).

Figure 7A:
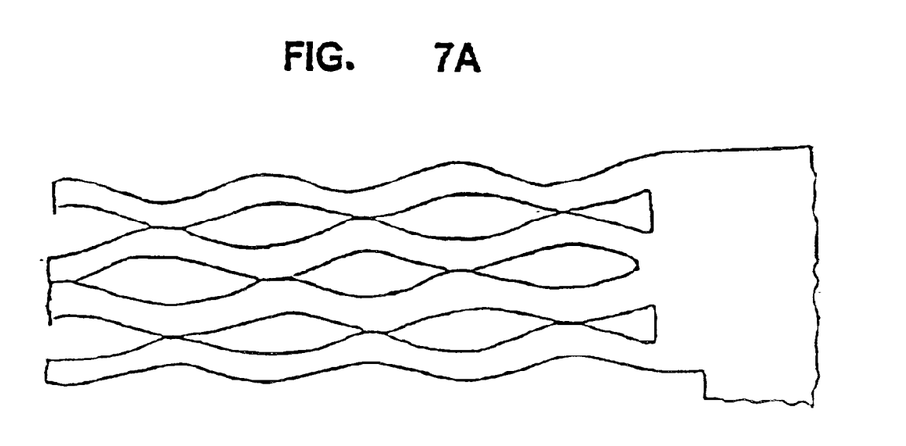
FIGS. 7, 8, 9 and 10 show various types of reticulated elements for the distribution of fluids and the connection between the bipolar plates and the electrodes inside the fuel cell stacks.

Making reference to FIG. 7A, an embodiment of the reticulated element (5), made of a flattened expanded sheet having a rhomboidal mesh is shown; in FIG. 7B, a planar fine net, having a square mesh is shown.

Figure 8:
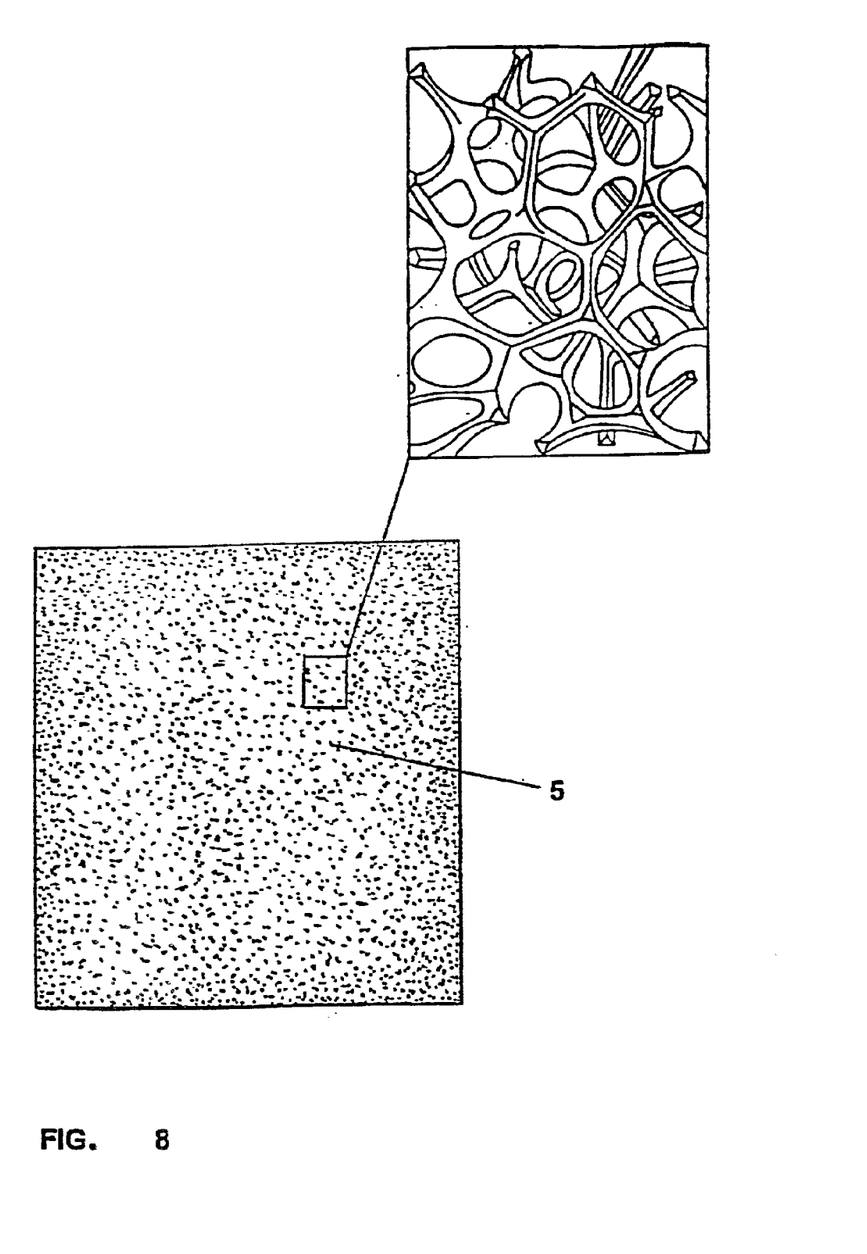
Figure 9:
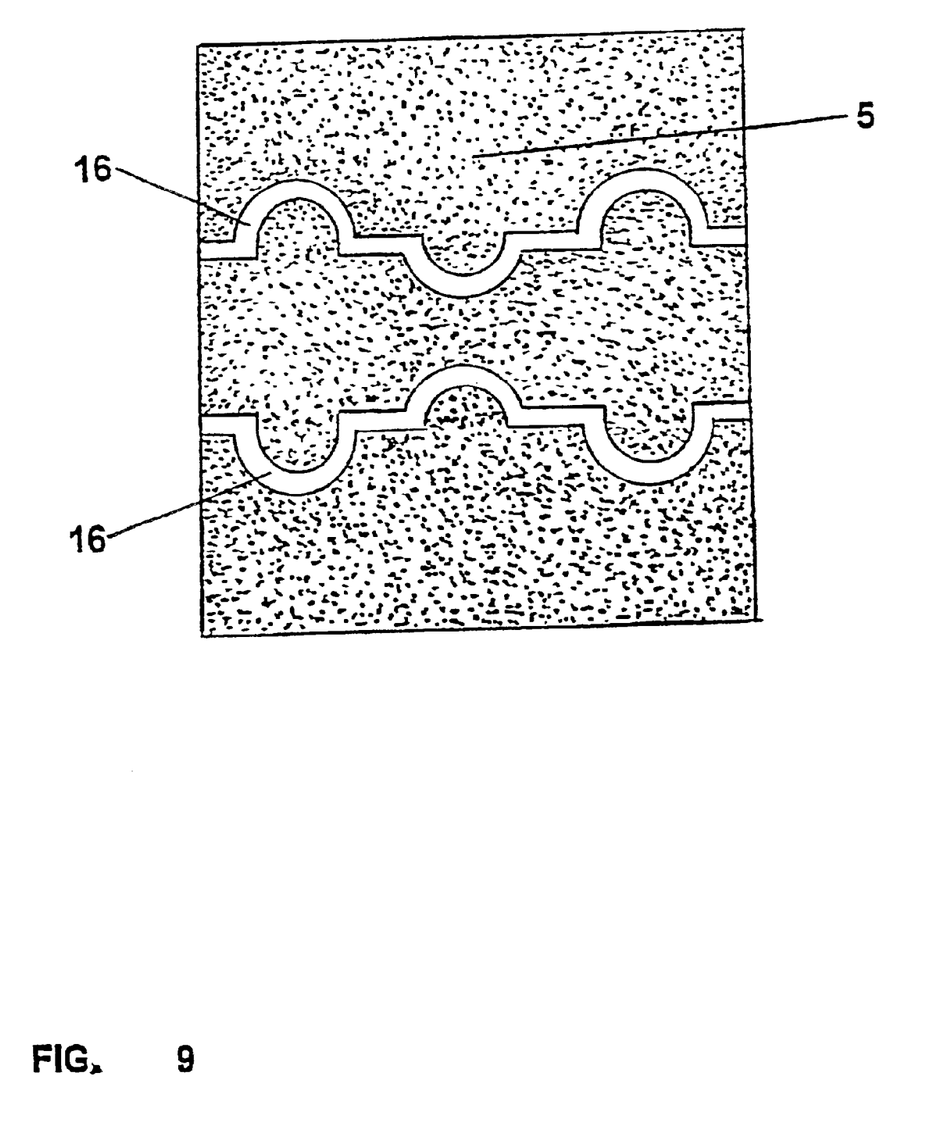
Figure 10:
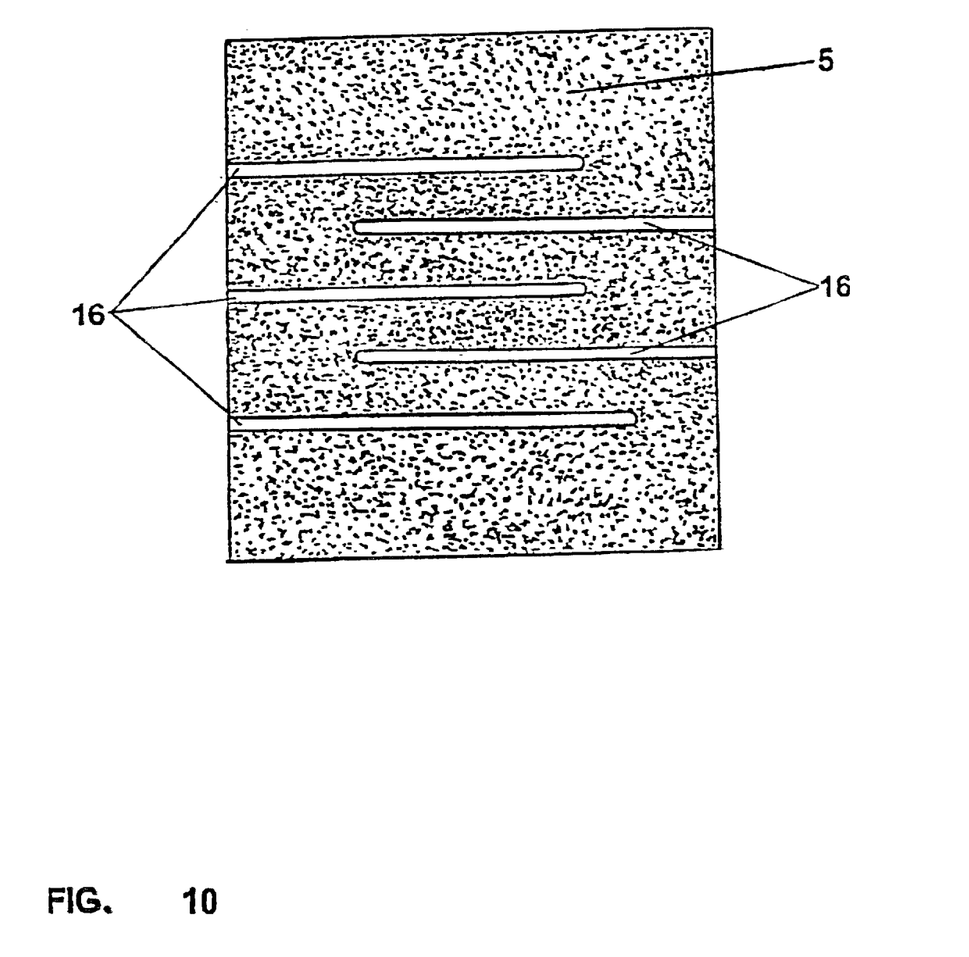

Making reference to FIGS. 8, 9 and 10, some embodiments of reticulated elements (5) are shown, made of a deformable metallic material, such as a metal foam; in the embodiments of FIGS. 9 and 10, depressions (16) acting as preferential channels for injecting water, are formed inside said metallic material, for example by cold-pressing.

EXAMPLE 1

Two stacks, one made of 15 and one made of 30 elementary cells (1), were manufactured according to the scheme of FIG. 1, and equipped with the following components:

Ion-exchange membranes (2) Nafion 115, commercialised by Dupont de Nemours

Electrodes (3) commercialised by E-Tek, Inc., under the trademark ELAT®, activated by a catalytic layer (4) made of platinum particles supported on active carbon, with an active surface of 200 $cm^2$.

Figure 3:
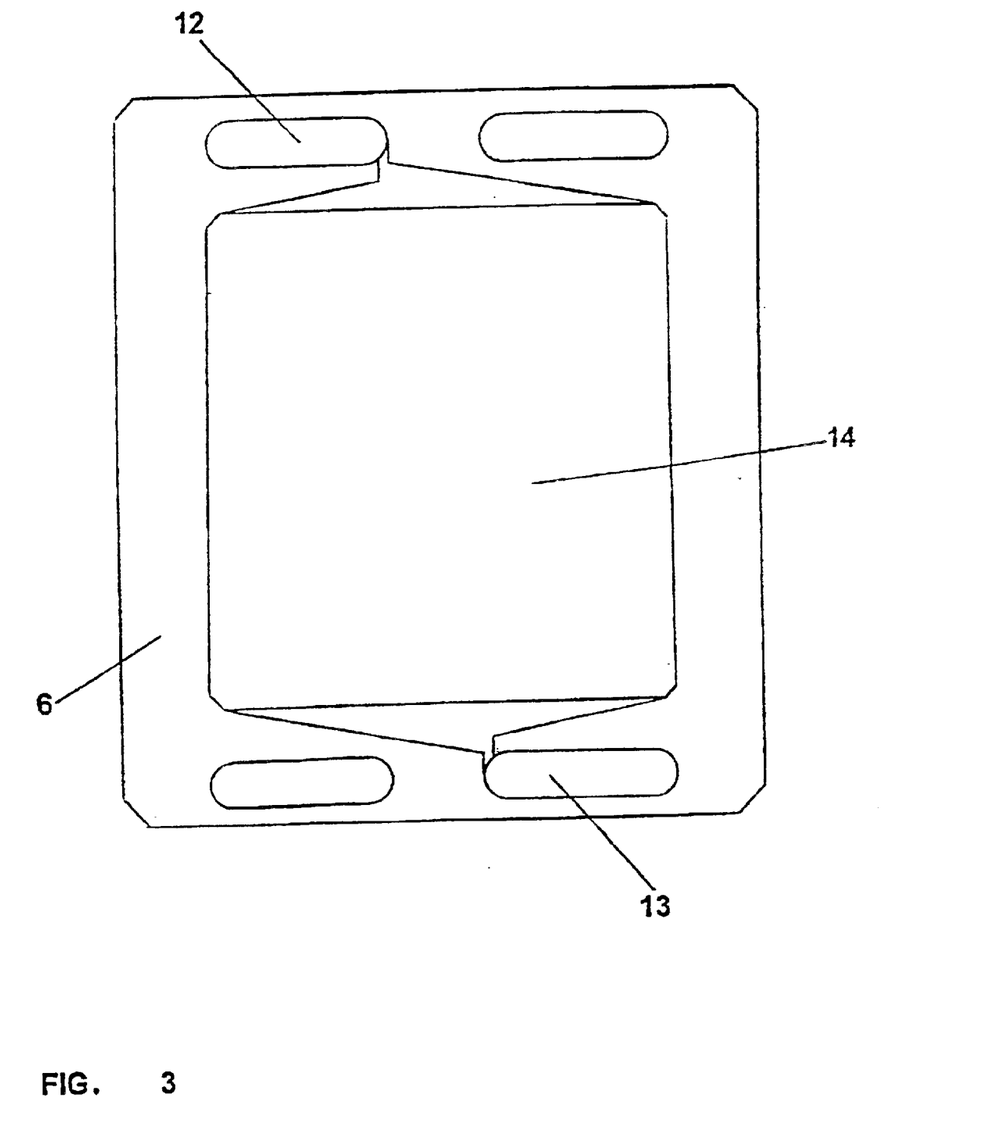
FIGS. 3, 4, 5 and 6 show various types of gaskets for fuel cells.

Reticulated elements (5) made of a nickel foam as shown in FIG. 8, having pores comprised between 1 and 3 mm Gaskets (6) according to the scheme of FIG. 3

Bipolar plates (7) made of a 2 mm thick stainless steel sheet.

Aluminum end plates (10), electrically connected to the bipolar plates (7) of the external cells, provided with current collecting sockets connected to a variable resistive load.

The stacks were connected, through suitable fittings mounted on one of the end plates (10), to the gaseous reactants supplies and to an external circuit where demineralized water, thermostated at the desired temperature by means of a heat exchanger, was circulated. Through these connections, the stacks were fed with a mixture containing 70% of hydrogen at the negative pole (anode), and with air at the positive pole (cathode), by means of the upper manifolds (8), obtained by the juxtaposition in a filter-press configuration of the upper holes (12) and the corresponding apertures in the bipolar plates (7). The same manifolds (8) were fed with a stream of demineralized water from the corresponding circuit, the flow-rate of which was regulated as needed, according to the dynamic responses of the system. The stacks were not provided with auxiliary cooling in addition to the on supplied by the evaporation of the water injected into the manifolds (8).

The stacks were operated for 12 hours at a current density of 300 $mA/cm^2$, regulating the temperature of the cells at 70° C., and monitoring the voltage of the single cells. The water flow-rate was manually regulated so as to maximise the voltage of the single cells. At the end of this manual regulation, a voltage comprised between 715 and 745 mV was detected on each cell of both stacks. In the 30 cell stack, the cells having the lowest voltage values were statistically distributed farther away from the end plate connected to the reactants and water inlets (tail cells); after the first hour of operation, the voltage of the single cells tended to remain generally constant.

The resistive load applied to the end plates (10) was then varied in order to draw a current density of 600 $mA/cm^2$ from to the two stacks; the 15 cell stack maintained a stable operation condition, with single cell voltages comprised between 600 and 670 mV, the lowest values being statistically distributed among the tail cells; the 30 cell stack was shut-down after about one hour, as the voltages exhibited by the end cells were continuously decreasing, most probably as a consequence of local overheating.

The same tests were repeated by atomising water with a ultrasonic aerosol generator, before injecting the same water to the upper manifolds (8). In all cases, no variation in the performance was observed.

COMPARATIVE EXAMPLE 1

A 15 fuel cell stack was made according to the prior art teachings, following the scheme of FIG. 2.

The stack was equipped with the following components:

Nafion 115 ion-exchange membranes (2'), commercialised by Dupont de Nemours

ELAT® electrodes (3') commercialised by E-Tek Inc., activated by a catalytic layer (4') made of platinum particles supported on active carbon, with an active surface of 200 $cm^2$.

Planar sealing gaskets (6'), having the same thickness as that of the electrodes (3')

Bipolar plates (7') made of a ribbed graphite sheet having a thickness of 5 mm.

Copper end plates (10'), electrically connected to the bipolar plates (7') of the external cells, provided with a current collecting socket connected to a variable resistive load.

Similarly to the previous Example, the stack was connected, by suitable fittings provided on one of the end plates (10'), to the feeding circuit of the gaseous reactants and to an external circuit where demineralized water, thermostated at the desired temperature by means of a heat exchanger was circulated. Through these connections, the stacks were fed with a mixture containing 70% of hydrogen at the negative pole (anode), and with air at the positive pole (cathode), through the upper manifolds (8'); a flow of demineralized water was fed from the corresponding circuit to the same manifolds (8'). The stacks were not equipped with auxiliary cooling in addition to the one provided by the evaporation of the water injected into the manifolds (8'). Notwithstanding all the attempts to regulate the water flow-rate, in the same way as described for the previous examples, it was not possible to reach a circuit density of 300 $mA/cm^2$, as the voltages of some cells, randomly distributed, tended to decrease with time due to overheating. By decreasing the current density, it was possible to obtain a stable operation at 70 mA/cm$^2$; at such value, the voltages of each single cell were distributed in a range comprised between 800 and 550 mV; it was possible to increase the current density up to 100 mA/cm$^2$ when water was atomised with the ultrasonic aerosol generator of the previous Example, but it was not possible to further increase the current output. The outcome of these tests indicated a scarce uniformity of the water injection among the various cells of the stack and, inside each cell, the irregular distribution of water inside the ribbed structure; upstream atomisation of water slightly mitigates the problem, without having the same efficiency of the fine fragmentation throughout the whole volume of the cell, produced by the reticulated element of the previous Example.

EXAMPLE 2

The two stacks of Example 1 were fed with the gaseous reactants and with water through the lower manifolds (9), using the upper manifolds (8) for discharging. Under these conditions, it was possible to operate also the 30 cell stack at 600 mA/cm$^2$, even though the voltages of the five tail cells remained below 600 mV. At the same current density, the voltages of the 15 cell stack were distributed in a range comprised between 650 and 670 mV; although the maximum values were close to those relative to the previous test, where injection was carried out through the upper manifolds, the distribution of the cell voltage values resulted much more homogeneous. The explanation resides in the fact that when a plurality of cells are fed in parallel through a manifold positioned at a higher level, it is possible that part of the water be collected on the bottom of the manifold itself, subsequently falling through the inlet of the group of cells closer to the water injection point. In the case of injection from the bottom, water does not fall into the cell being instead suctioned by the inlet gas, providing a more uniform flow inside each single cell.

EXAMPLE 3

The tests of Examples 1 and 2 were repeated feeding pure hydrogen as the fuel closing the outlet manifold on the anode side and injecting water only to the air inlet manifold. In both cases it has been observed that the performances of the stacks were substantially the same as in the previous cases, the detected slight increases in the cells voltages being due to the increase of the fuel molar fraction. Furthermore, it has been observed that in the case of total consumption of a pure fuel at the anode (dead-end operation), it is sufficient to humidify only the flow of the oxidant.

In this case, the upstream atomisation of water with the ultrasonic aerosol generator did not produce any positive effect.

EXAMPLE 4

The 30 cell stack of the previous examples was rotated by 35° with respect to its main axis, so that for each of the gaskets (6) fed with air, the lower hole (13) was placed at a lower level with respect to its initial position, and consequently the whole lower manifold (9) on the air side was at a lower level with respect to its initial level. The stack was then fed with air from the corresponding lower manifold (9), where water was injected as in the previous examples. Pure hydrogen was fed from the corresponding lower manifold (9) to total consumption, without any humidification and closing the relevant upper manifold (8), according to a dead-end mode operation.

A 45 fuel cell stack was manufactured according to the prior art teachings, following the scheme of FIG. 1, equipped with the following components:

Ion-exchange membranes (2) commercialised by Gore, U.S.A. under the trademark Gore Select®.

Electrodes (3) commercialised by E-Tek Inc, U.S.A. under the trademark ELAT®, activated with a catalytic layer (4) made of platinum particles supported on active carbon, with an active surface of 900 cm$^2$.

Figure 4:
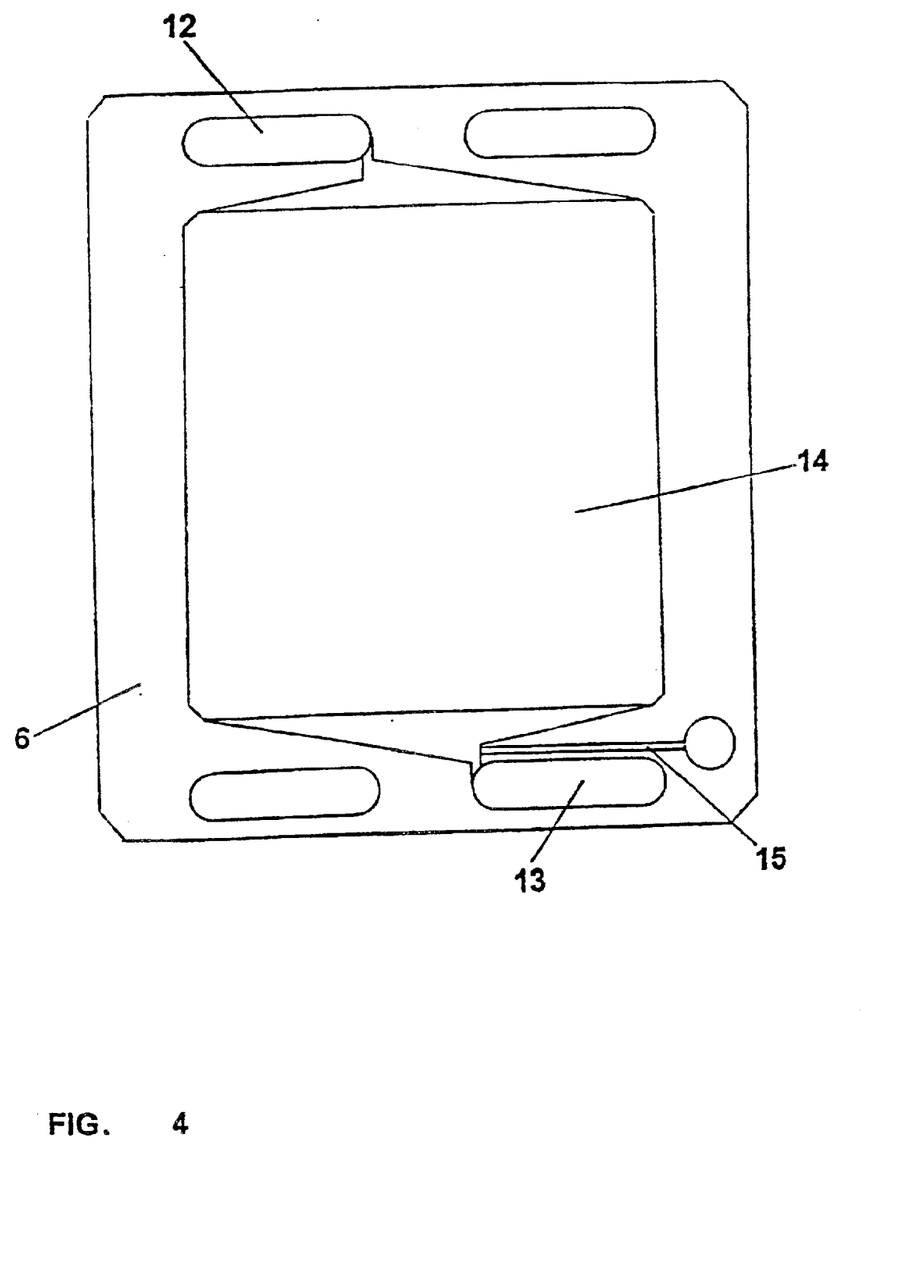

Reticulated elements (5) made by superimposing a flattened expanded sheet, as shown in FIG. 7A, against the bipolar plate (7), having a rhomboidal mesh with side length of 3 mm, and planar fine net against the electrode (3), as shown in FIG. 7B, having a square mesh with side length of 1 mm; both the expanded sheet and the planar mesh were made of stainless steel AISI 316L Gaskets (6) according to the scheme shown in FIG. 4

Bipolar plates (7) made of 2 mm thick stainless steel sheet.

End plates made of aluminum (10), electrically connected to the bipolar plates (7) at each end of the stack, provided with current collecting sockets connected to a variable resistive load.

The stack was connected, through suitable fittings provided on one of the end plates (10), to the feeding circuit of the gaseous reactants and to an external circuit where demineralized water, thermostated at the desired temperature by means of a heat exchanger, was circulated. Through these connections, the stacks were fed with pure hydrogen at the negative pole (anode), and with air at the positive pole (cathode), by means of the lower manifolds (9) obtained by juxtaposing the lower holes (13) and the corresponding holes in the bipolar plates (7) in a filter-press configuration. A flow of demineralized water, whose rate was regulated as needed, according to the dynamic responses of the system, was supplied from the relevant circuit to the injection channels (15). The stack was not equipped with auxiliary cooling in addition to the one provided by the evaporation of the water fed to the injection channels (15).

The stack was operated for 12 hours at a current density of 700 mA/cm$^2$, regulating the cell temperature at 75° C. and monitoring the voltages of the single cells. The water flow rate was manually regulated up to maximising the single cell voltages. At the end of this manual regulation, all the cells of the stack displayed a voltage comprised between 680 and 700 mV, which remained stable with time. This test permitted to verify that, compared to the type of gasket used in the previous examples, which determined the mixing of gas and water in the inlet manifold, the use of the gasket shown in FIG. 4, wherein the mixing of the two fluids occurs in a smaller duct, downstream the inlet manifold, is more advantageous.

Also in this case it has been verified that the atomisation of the water injected in an air flow supplied to the channels (15) does not offer any beneficial effect.

EXAMPLE 6

Figure 5:
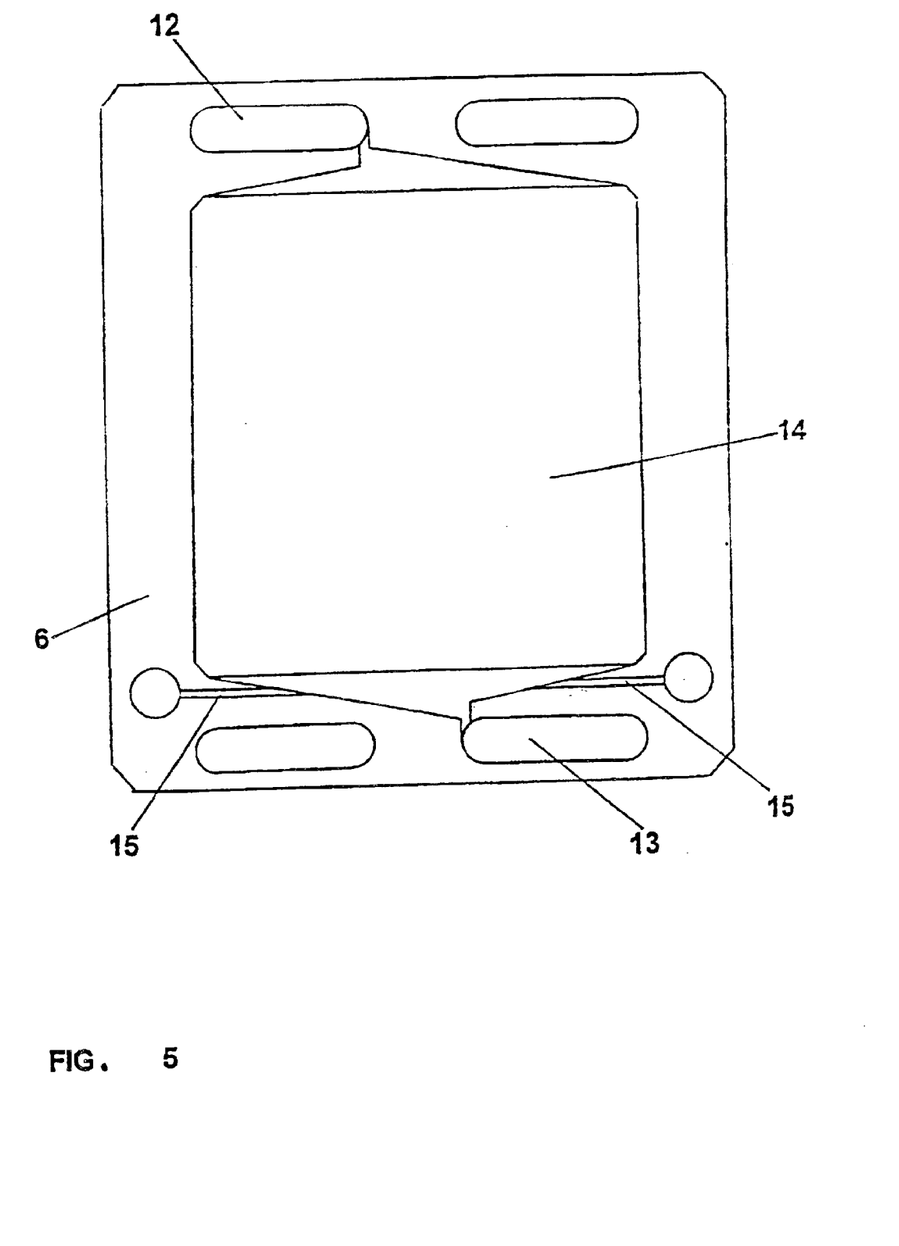

A 45 fuel cell stack was assembled, similar to the one of the previous example with the only exception of the gaskets which corresponded to those of FIG. 5. This type of design provides a separate feeding, in mutually parallel directions, of the gas and water streams, which are mixed only after the insertion into the reticulated element (5), ensuring an even more uniform distribution of water inside the single cells. This stack, operated at 700 mA/cm$^2$ under the same operating conditions of Example 5, displayed cell voltage values comprised between 700 and 715 mV.

EXAMPLE 7

Figure 6:
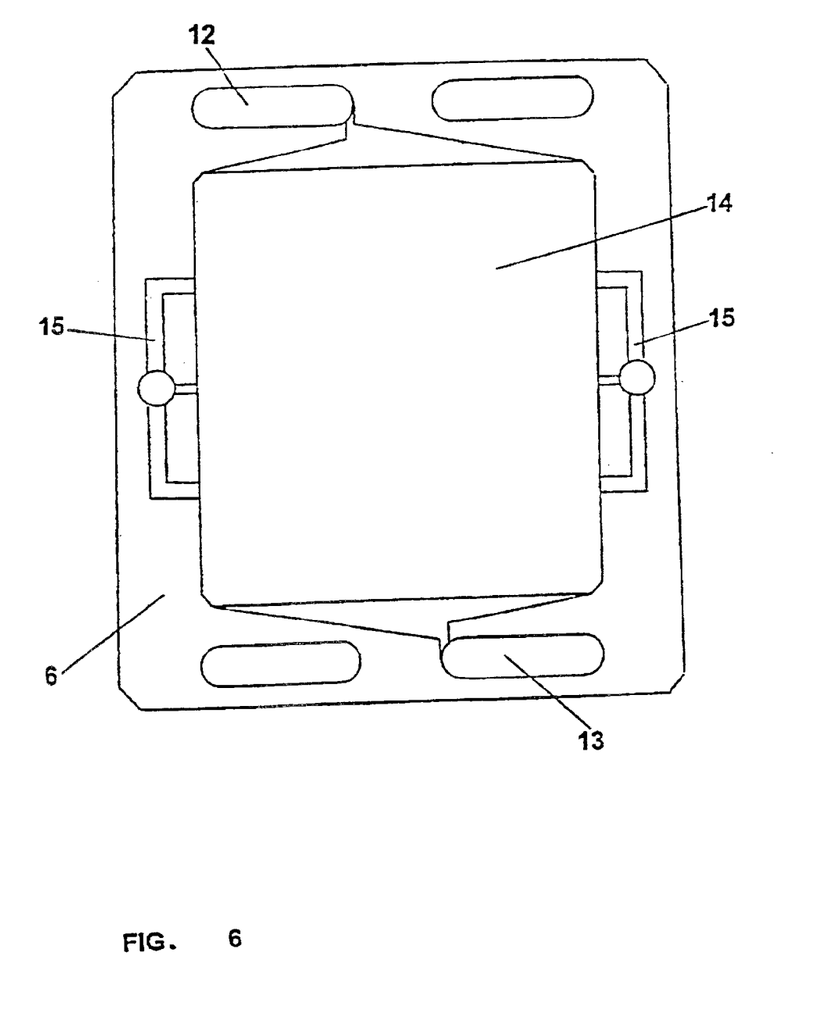

A 45 fuel cell stack was assembled, similar to the one of the previous example with the only exception of the gaskets, which corresponded to those of FIG. 6, and the reticulated element (5), which was made of a nickel foam similar to that of Example 1. The stack was connected so as to feed the reactants from the upper manifolds (8) and to discharge the same from the lower manifolds (9). With this gasket design, the injected gas and water streams, besides being separated until after insertion into the reticulated element (5), mix in mutually orthogonal directions. In this case, in order to ensure a sufficient humidification of the upper zone of the reticulated element, the water flow was split so as to enter to a large extent into the channels (15), and to a minor extent into the upper manifolds (8), used for feeding the cells. The portion of water injected into the channels (15) was set around 90% of the total, and in any case not below 80%. This stack, operated at 700 mA/cm² under the same operating conditions of the Examples 5 and 6, displayed cell voltage values comprised between 710 and 730 mV.

EXAMPLE 8

A 45 fuel cell stack was assembled, similar to the one of Example 6 with the only exception of the reticulated element (5), which was made of a nickel foam as Shown in FIG. 9. In this case, the deformability of the metal foam was exploited to produce two small channels or depressions (16) for the preferential distribution of water in a substantially parallel direction with respect to the gas flow; said channels were in the form of serpentines which crossed the whole surface of the foam. In order to form the depressions (16), it is sufficient to cold-press a metal wire with the desired thickness into the metal foam. In this case, 3 mm wide serpentines were obtained by cold-pressing a steel wire with the same thickness. It is obviously possible to form a single serpentine (16), to be fed from a single channel (15), or also more than two serpentines. This stack, operated at 700 mA/cm² under the same operating conditions of Examples 5, 6 and 7, displayed cell voltage values comprised between 715 and 730 mV.

EXAMPLE 9

A 45 fuel cell stack was assembled, similar to the one of Example 7 with the only exception of the gaskets (6), which corresponded to those of FIG. 6 and the reticulated element (5), which was made of the nickel foam illustrated in FIG. 10. Also in this case, the permanent deformability of the metal foam was exploited to produce two small channels for the preferential distribution of water, in this case, however, an offset double comb-shaped geometry was chosen to create a series of parallel ducts which were fed with water in a substantially orthogonal direction with respect to the direction of the gas flow. This increases the overall pressure drop inside the reticulated element (5) and forces the gaseous reactants to follow more tortuous paths, distributing the same along the whole active surface of the cell and avoiding stagnation or depletion areas. This stack, operated at 700 mA/cm² under the same operating conditions of Examples 5, 6 and 7, displayed cell voltage values comprised between 730 and 740 mV.

Although the invention has been described making reference to specific embodiments, the latter are not intended to limit the invention, the scope of which is defined in the following appended claims.

What is claimed is:

1. A stack of polymeric membrane fuel cells fed with gaseous reactants wherein said membrane separates an anodic compartment from a cathodic compartment comprising bipolar plates, gaskets optionally provided with channels for feeding and discharging fluids, porous electrodes, catalytic layers interposed between the membranes and the electrodes, manifolds for feeding the flow of reactants, manifolds for the discharge of the unconverted portions of the reactants, of the inerts and of the produced water, and at least an injection point connecting a hydraulic circuit wherein a water flow is provided inside at least one compartment of the cells, said water flow provides contemporaneously for the humidification of the membranes and for the removal of the generated heat, characterised in that at least one compartment of the cells fed with the reactants and water coming from the injection point comprises an electrically and thermally conductive reticulated element interposed between the electrodes and the bipolar plates, which distributes said water flow through the whole volume occupied by the gaseous reactants.

2. The stack of claim 1 characterised in that the injection point of water is positioned outside said at least one compartment.

3. The stack of claim 2 characterised in that said injection point of water is positioned at the inlet of the manifold for feeding the flow of reactants.

4. The stack of claim 3 characterised in that said manifold for feeding the flow of reactants is a lower manifold.

5. The stack of claim 4 characterised in that said stack is rotated with respect to its main axis and said manifold is in the lowest position.

6. The stack of claim 1 characterised in that only one of the compartments of the cells is fed with water.

7. The stack of claim 1 characterized in that only one of the compartments of the cells is fed with water.

8. The stack of claim 2 characterised in that said injection point of water is positioned in channels formed in the gaskets, downstream the manifold for feeding the flow of reactants.

9. The stack of claim 1 characterised in that said injection point of water is positioned inside the cells.

10. The stack of claim 8 characterised in that the orientation of the injection of water is substantially parallel to directions of the reactants flow.

11. The stack of claim 8 characterised in that the orientation of the injection of water is substantially orthogonal to the direction of the reactants flow.

12. The stack of claim 1 characterised in that said reticulated element is deformable by cold-pressing.

13. The stack of claim 12 characterised in that said reticulated element deformable by cold-pressing is a metal foam.

14. The stack of claim 13 characterised in that said metal foam contains nickel.

15. The stack of claim 12 characterised in that said reticulated element comprises at least one depression for water distribution.

16. The stack of claim 15 characterised in that said at least one depression is obtained by cold-pressing.

17. The stack of claim 15 characterised in that the orientation of said at least one depression is substantially parallel to the direction of the reactant flow.

18. The stack of claim 17 characterised in that said depressions have the form of a serpentine.

19. The stack of claim 15 characterised in that the orientation of said at least one depression is substantially orthogonal to the direction of the reactant flow.

20. The stack of claim 19 characterised in that said depressions are disposed according to an offset double comb-shaped geometry.

* * * * *